Feb. 28, 1950     W. C. LUTZ     2,499,224
CLUTCH PULLEY
Filed April 1, 1947                2 Sheets-Sheet 1
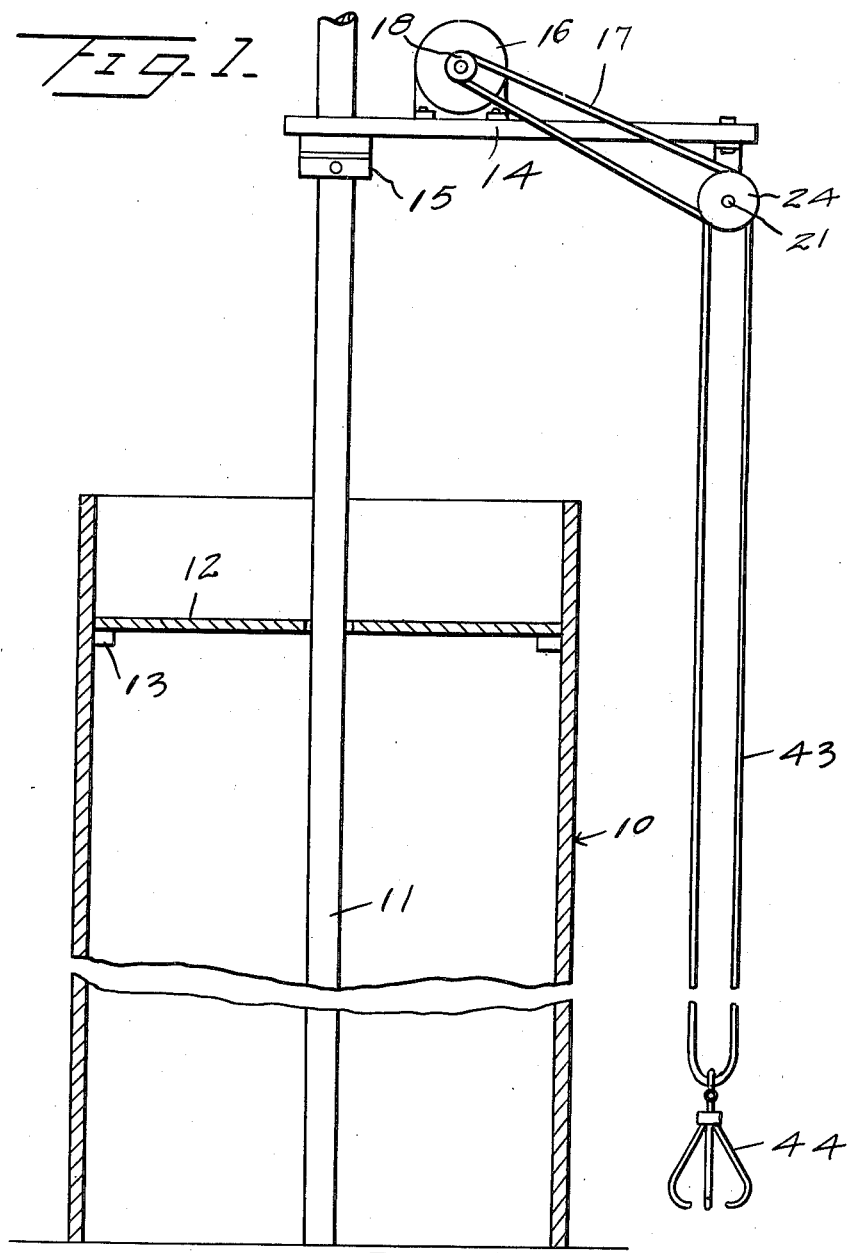
Inventor
W.C. Lutz
By Kimmel & Crowell
Attorneys

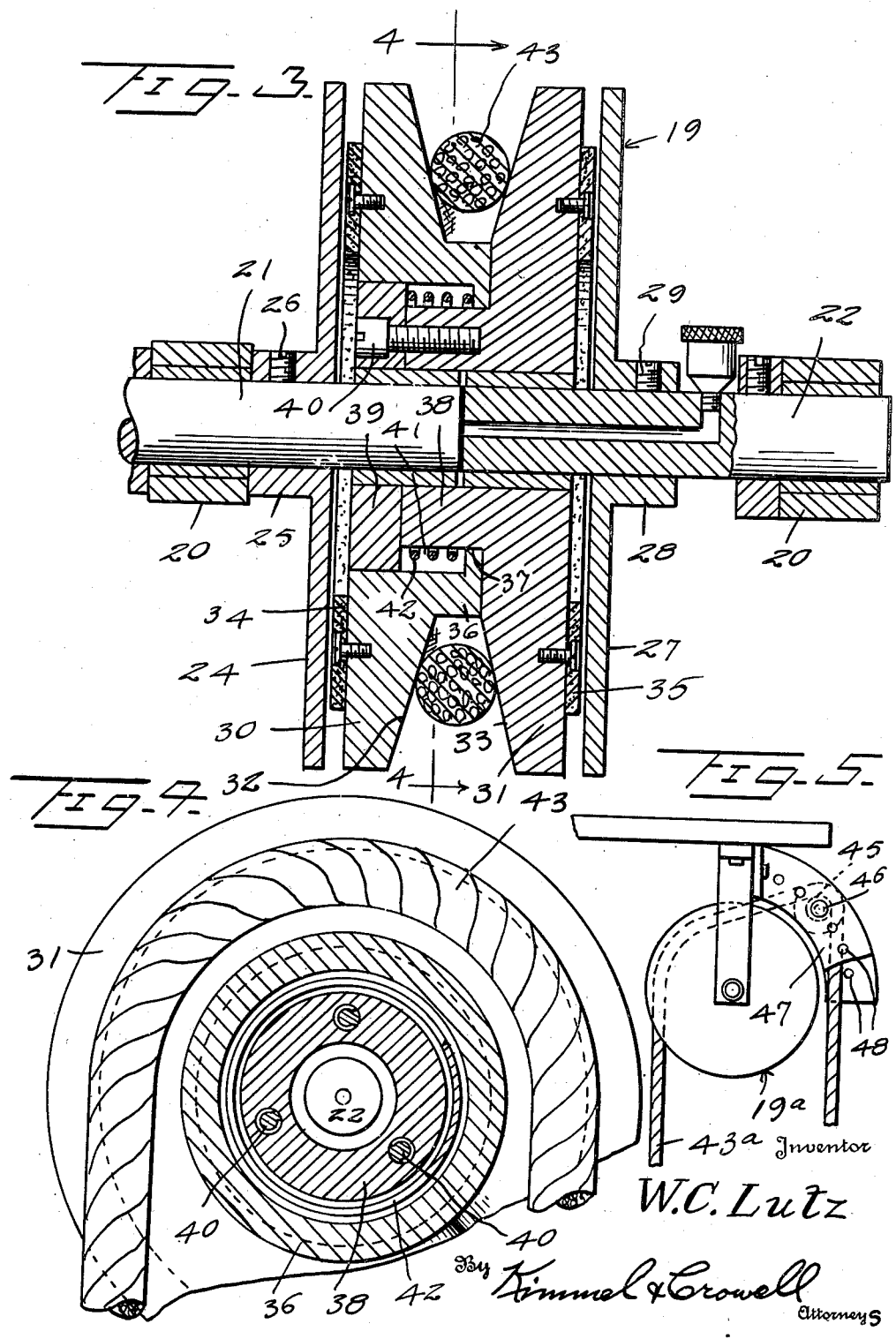

Patented Feb. 28, 1950

2,499,224

UNITED STATES PATENT OFFICE 2,499,224

CLUTCH PULLEY

Willard C. Lutz, Lancaster, Pa.

Application April 1, 1947, Serial No. 738,535

2 Claims. (Cl. 74—230.17)

1

This invention relates to automatic clutches.

An object of this invention is to provide an automatic clutch which is combined with a pulley and is adapted as an example for use in elevating material in the building or other work about a silo or other structure.

Another object of this invention is to provide an automatic clutch and pulley which will also function as a differential so that it can be used for small vehicles.

A further object of this invention is to provide an automatic clutch which is of simple construction and which is held in clutching position by a wedging action on the belt or other flexible element which engages in the groove formed between the movable clutch elements.

With the above and other objects in view, my invention consists in the arrangement, combination and details of construction disclosed in the drawings and specification, and then more particularly pointed out in the appended claims.

In the drawings,

Figure 1 is a fragmentary vertical section of a silo embodying this invention,

Figure 2 is a detail side elevation of the automatic clutch,

Figure 3 is an enlarged sectional view taken on the line 3—3 of Figure 2,

Figure 4 is a fragmentary sectional view taken on the line 4—4 of Figure 3,

Figure 5 is a modified form of this invention.

Referring to the drawings, the numeral 10 designates generally a silo which may be under construction and which has a center post 11 extending therethrough and terminating above the top thereof. A platform 12 is disposed on a ledge 13 at the upper portion of the silo 10 so that a workman may readily stand on the platform during the work of assembling the silo.

The upper end of the post 11 has extending therefrom a swinging arm 14. The arm 14 is held against downward movement by means of a collar 15 secured to the post 11. A motor 16 is mounted on the arm 14 and has a belt 17 trained about the driving pulley 18 thereof. A combined clutch and pulley generally designated as 19 is supported below the swinging arm 14 by means of bearing hangers 20. The combined pulley and clutch 19, shown in greater detail in Figures 3 and 4, includes a pair of aligned end abutting shafts 21 and 22 which are journaled in the lower ends of the bearing hangers 20.

The shaft 21 has a pulley 23 fixed thereto and about which the belt 17 is trained for effecting powered rotation of the shaft 21. A clutch plate

2

24, having a bushing 25 is fixed by means of a set screw 26 to the shaft 21. A second outer clutch plate 27, formed with a collar or bushing 28 is fixed by means of a set screw 29 to the shaft 22. An intermediate pair of clutch plates 30 and 31 are disposed between the outer clutch plates 24 and 27 and are formed with confronting tapering faces 32 and 33 respectively.

The outer side of the plate 30 has fixed thereto an annular fibrous clutch facing 34, and the outer face of the clutch plate 31 has fixed thereto an annular fibrous clutch facing 35. The clutch plate 30 is formed with a cylindrical hub or central portion 36 which has extending inwardly therefrom an annular flange 37. The clutch plate 31 is formed with a centrally disposed cylindrical hub or bushing 38 which extends through the flange 37.

A collar 39 is fixed by fastening devices 40 to the outer end of the bushing or hub 38 and forms, with the flange 37, an annular spring chamber 41, within which an expansible spring 42 is mounted. One end of the spring 42 bears against the inner side of the collar 39 and the other end of the spring 42 bears against the annular flange 37 so that the two clutch plates 30 and 31 will be normally biased toward each other, and to declutching position, which is the position shown in Figure 3.

A rope or flexible member 43 is trained about the combined clutch and pulley, engaging in the space between the inclined faces 32 and 33. The rope 43 depends from the swinging arm 14 and has fixed thereto a material grab hook 44. The tension of the spring 42 is such that when the grab hook 44 is empty the two clutch plates 30 and 31 will be moved by the spring 42 to declutching position. When a weight is placed on the grab hook 44 the rope 43 will force the plates 30 and 31 apart so that the clutch facings 34 and 35 will frictionally engage the outer clutch plates 24 and 27. After the material has been elevated to the upper portion of the silo 10, the material may be removed from the grab hook 44, thereby permitting the spring 42 to immediately draw the clutch plates 30 and 31 toward each other and to declutching position. This operation may take place with the motor 16 continuously operating. The grab hook 44 will then swing downwardly to its lowermost position where additional material may be secured thereto, and the weight of this material will immediately cause the clutch plates 30 and 31 to move outwardly to clutching position.

While the combined clutch and pulley is herein shown as being associated with elevating means for elevating material in the construction of a silo or the like, this combined clutch and pulley will also serve as a differential in a drive shaft construction. In other words, the structure herein disclosed may be used on a vehicle such as a small vehicle where the shafts 21 and 22 form the axles for one pair of wheels. The pulley which is formed by the two clutch plates 30 and 31 may have the flexible member 43 trained thereabout and this flexible member may be in the form of an endless drive belt connected to a power member.

Where the vehicle is making a turn and one wheel will rotate faster than the other, the outer axle or shaft may rotate independently of the inner axle or shaft, the associated clutch member 30 or 31 rotating independently of the other clutch plate.

In Figure 5 there is disclosed a slightly modified form of this invention, wherein a combined pulley and clutch 19a is disclosed which is similar in every detail to the combined pulley and clutch 19. An idler pulley 45 which is carried by shaft 46 is disposed between a pair of supporting arms 47 and the rope or cable 43a is adapted to be extended from pulley 19a about idler pulley 45. In this manner the pulley 19a may be selectively relieved from a portion of the weight of the rope or cable 43a. This is particularly desirable where this device is used in the construction of a silo or other construction and the rope or cable 43a will be progressively increased in length.

In order to accomplish the adjustment of pulley 45 the supporting arms 47 are provided with a series of spaced holes 48 within which the shaft 46 is adapted to selectively engage. In practice this combined clutch and pulley is so constructed that in order to effect clutching of the device to the shaft, it is necessary that the rope or cable be pulled downwardly on one run thereof, and when this pull is relaxed the pulley will be moved to declutched position.

I do not mean to confine myself to the exact details of construction herein disclosed, but claim all variations falling within the purview of the appended claims.

What I claim is—

1. A combined pulley and automatic clutch comprising a pair of aligned shafts, a pair of outer clutch plates fixed one to each of said shafts, an inner pair of plates disposed between said outer plates and formed with inclined confronting faces, a fibrous facing on the outer side of each of said inner plates, oppositely extending telescoping hub members carried by said inner plates, an inwardly extending annular flange carried by the outer one of said hub members, a collar fixed to the inner one of said hub members, and a spring between said flange and said collar for normally urging said inner plates toward each other and to declutching position relative to said outer plates.

2. A combined pulley and clutch comprising a pair of outer clutch plates fixed on the ends of a pair of aligned shafts, a pair of inner clutch plates loose on said shafts between said outer plates and formed with confronting inclined faces, a cylindrical hub on one of said inner plates, a cylindrical hub on the other of said inner plates engageable about said first hub and spaced thereabout, and spring means between said hubs constantly urging said inner plates together out of engagement with said outer plates, whereby said inner plates may be engaged with said outer plates upon tensioning a belt engaging between the inclined faces of said inner plates moving said inner plates apart for engagement with said outer plates.

WILLARD C. LUTZ.

REFERENCES CITED

The following references are of record in the file of this patent:

UNITED STATES PATENTS

| Number | Name | Date |
|---|---|---|
| 458,186 | Piers | Aug. 25, 1891 |
| 691,908 | Little | Jan. 28, 1902 |
| 1,122,933 | Hufford | Dec. 29, 1914 |
| 2,254,592 | Berkeley | Sept. 2, 1941 |
| 2,321,494 | Krag | June 8, 1943 |